(No Model.)  2 Sheets—Sheet 1.
D. P. F. CARDOZO.
PROCESS OF AND APPARATUS FOR MAKING SALT.
No. 508,915. Patented Nov. 21, 1893.
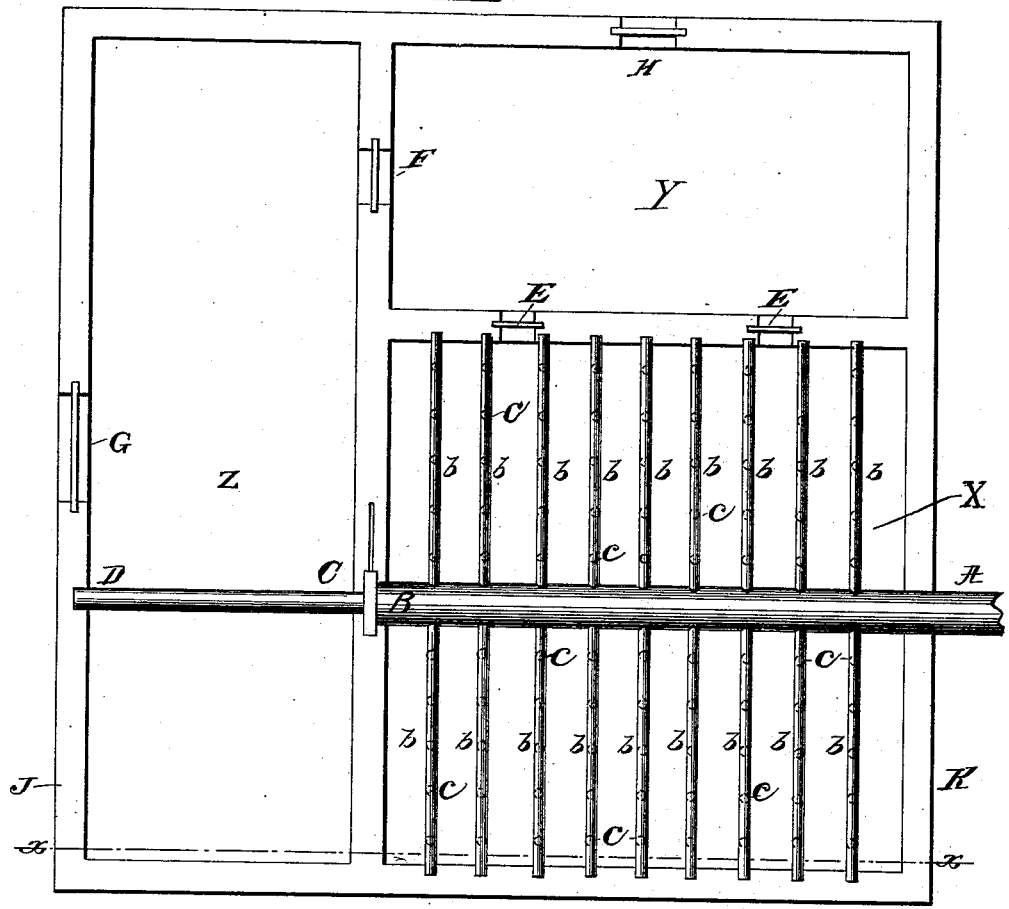
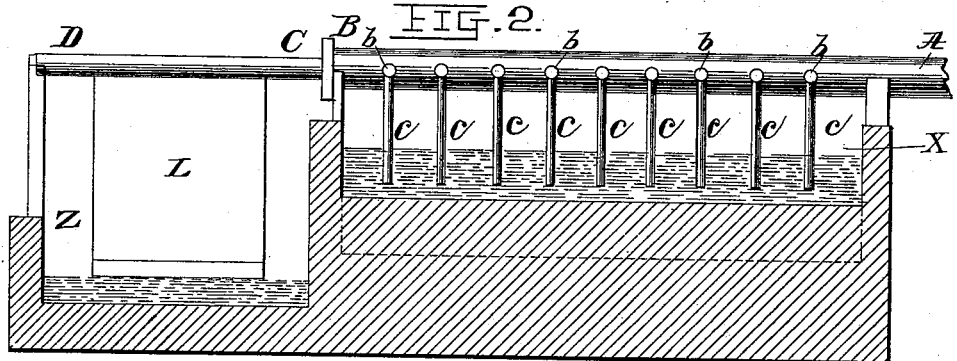
WITNESSES:
INVENTOR
Daniel P Ferro Cardozo
BY Phillips Abbott,
ATTORNEY

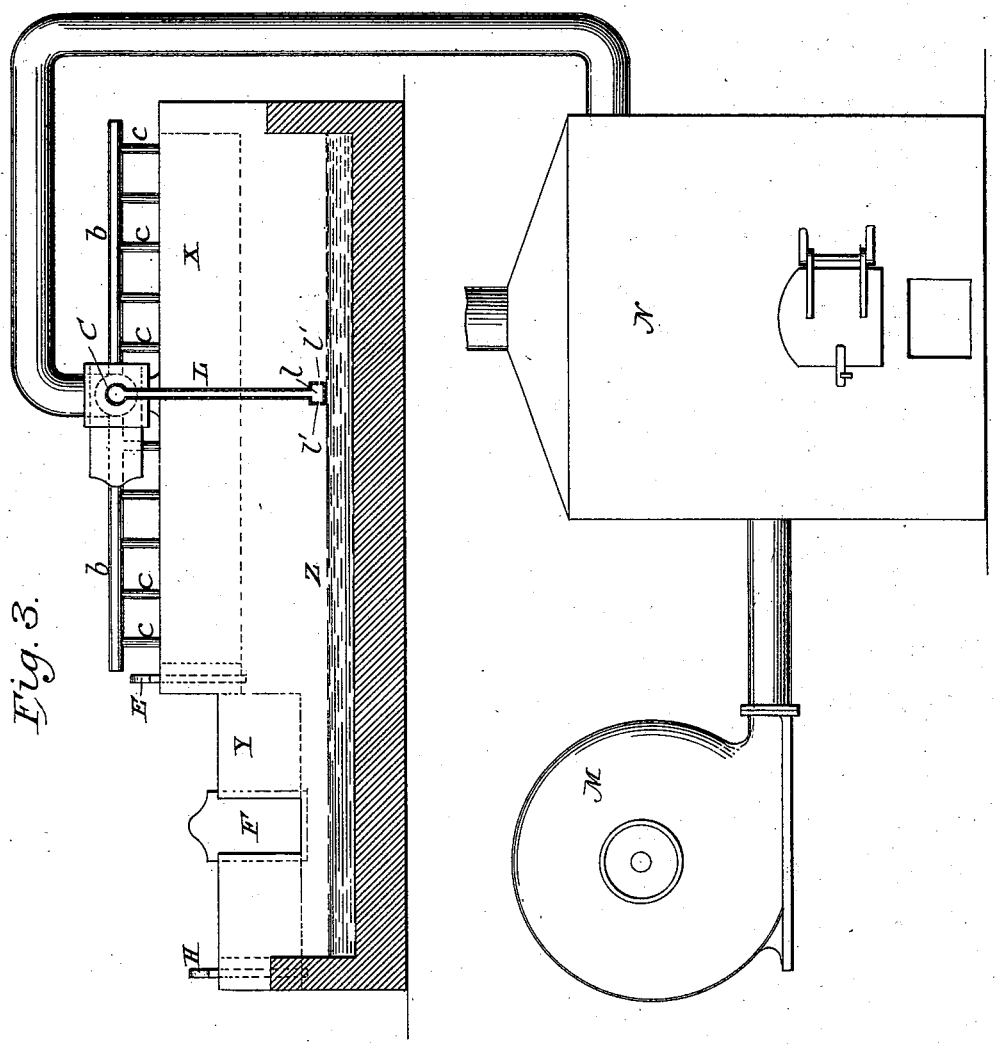

UNITED STATES PATENT OFFICE.

DANIEL PEDRO FERRO CARDOZO, OF RIO JANEIRO, BRAZIL.

PROCESS OF AND APPARATUS FOR MAKING SALT.

SPECIFICATION forming part of Letters Patent No. 508,915, dated November 21, 1893.

Application filed July 20, 1892. Serial No. 440,595. (No model.)

*To all whom it may concern:*

Be it known that I, DANIEL PEDRO FERRO CARDOZO, a citizen of the United States of Brazil, residing at Rio Janeiro, Brazil, have invented certain new and useful Improvements in Processes of and Apparatus for Evaporating Salt, of which the following is a specification.

According to my invention, I cause the evaporation of brine by means of jets of air forced into it and caused to pass through it, and in so doing to absorb moisture and carry it off from the salt contained in the brine. After the brine has been concentrated to a sufficient extent, I transfer it from the concentrating tank or vessel to a depositing tank or vessel, in which oxide of iron, carbonate and sulphate of lime and other impurities are separated from the saline matter which is then transferred to a third tank, where crystallization is effected, being aided by jets of air injected over the surface of the liquid, but not into the body thereof.

My invention involves an improved process and also improved apparatus, the details of which will be hereinafter described. Ordinary atmospheric air may be employed, or the air may be dried or heated, if desired, it being understood that I avail myself of the hygroscopic properties of the air to absorb moisture from the brine and thereby cause its evaporation.

My process and apparatus are especially designed for extracting bay-salt, (sodium chloride) from sea or other water, but they may be employed to advantage in extracting sugar from the juice of sugar cane, or from beet roots.

The subject-matter deemed novel will be particularly pointed out in the claims.

In the accompanying drawings, Figure 1 is a plan view of an apparatus constructed in accordance with my invention, for carrying out my improved process. Fig. 2 is a section on the line $x$—$x$ of Fig. 1. Fig. 3 is a view of my improved evaporating apparatus, partly in section and showing diagrammatically the blower, the heater and their connection with the discharge pipes of the evaporating apparatus.

Three tanks, vats or vessels X, Y, Z, are employed and they are all on different levels, the bottom of the tank X being elevated above the bottom of tank Y, while the bottom of tank Y is on a higher level than the bottom of tank Z. Valves or gates E E, connect tank X with tank Y, while a gate F, connects tank Y with tank Z. Tank Y, is provided with a discharge gate H, and tank Z, with a discharge gate G. Above the tank X, is a large horizontal pipe or conduit A B, extending from one side of the tank to the other. This pipe is provided on each side with a series of laterally projecting pipes $b$, of smaller area, eighteen in all being shown, but a larger or smaller number may be used. These pipes extend from the pipe A B to the end walls of the tank X, and each pipe is provided with a series of downwardly extending pipes $c$, which reach to near the bottom of the tank X, below the liquid level therein. These pipes are open at bottom and are arranged symmetrically throughout the tank.

The pipe or conduit A B, communicates with a source of air supply, preferably with a blower or pump M, by means of which air is forced under pressure into the pipe, then into its branches $b$, and down through the vertical pipes $c$, into the brine. The air before reaching the tank X, may be heated or dried in any suitable way in a heater N. The conduit A B, is provided with a branch pipe C D, extending across the tank Z, and this branch pipe is provided with a downwardly extending conduit L, having at its lower end a lateral extension $l$, provided with lateral openings $l'$, by which air is forced horizontally over the surface of the liquid to promote the crystallization of the salt.

The concentration tank X, is filled with the liquid to be evaporated to a depth of say forty inches, more or less, and air is forced through the vertical tubes $c$, into the liquid near the bottom of the tank. The air rises through the liquid, absorbs vapor therefrom, and the volume of liquid is rapidly reduced and concentration is soon effected. When the liquid has reached, say 25° 5″ of Baumé's hydrometer, the concentration may be stopped. The liquid is then drawn off from the tank X, into the depositing tank Y, where it is allowed to rest until its impurities have settled. By this means, oxide of iron, carbonate and sulphate of lime and other such impurities will be deposited, as they will settle before the salt does.

At the proper time, impurities are drawn off from the gate H. After a proper length of time, the gate F, is opened and the crystalline water is passed into the tank Z, where the salt is crystallized by evaporating the remainder of the water contained in the brine, by means of currents of air forced horizontally through the openings $l'$. By blowing the air horizontally over the surface of the liquid, the agitation thereof is prevented, but the crystallization thereof is effected. The crystallized salt may be removed from the tank through the gate Z.

I claim as my invention—

1. The herein described process, which consists in forcing into the brine to be evaporated a series of jets of air, causing said jets to pass through the liquid and absorb moisture therefrom and to thereby concentrate the liquid, then transferring the liquid from the concentration tank to another tank, and there causing the impurities, such as oxide of iron, carbonate and sulphate of lime to be deposited, then separating the impurities from the saline solution, then transferring the saline solution (free from impurities) to a third tank, and then causing atmospheric air to act on the surface of the liquid to evaporate it to cause the crystallization of the salt.

2. The herein described process, which consists in forcing atmospheric air into the brine to be evaporated, to cause the concentration thereof, then allowing the liquid to stand and causing it to deposit impurities, then separating these impurities from the saline solution, and then causing atmospheric air to act upon the surface of the liquid to cause the evaporation thereof and to crystallize the salt.

3. The combination of the concentration tank X, the main air supply pipe or conduit arranged over it, and a series of horizontally arranged branch pipes extending laterally from the main pipe, a series of vertically arranged pipes communicating with each branch pipe and extending into the tank below the liquid level, a depositing tank below the level of the concentration tank, a gate for opening and closing communication between the concentration tank and the depositing tank, a gate H for drawing off impurities from the depositing tank, a crystallizing tank Z, below the level of the depositing tank, a gate for opening and closing communication between the crystallizing tank and the depositing tank, a gate for drawing off the crystallized salt from the crystallizing tank, and an air pipe or conduit for supplying air to the crystallizing tank, substantially as set forth.

Signed at New York, in the county of New York and State of New York, this 18th day of July, A. D. 1892.

DANIEL PEDRO FERRO CARDOZO.

Witnesses:
PHILLIPS ABBOTT,
C. LIMA.